United States Patent
Battre et al.

(10) Patent No.: US 10,380,614 B1
(45) Date of Patent: Aug. 13, 2019

(54) USER RESET VOTING TO IDENTIFY UNWANTED SETTINGS VALUES IN CLIENT SOFTWARE

(71) Applicant: GOOGLE INC., Mountain View, CA (US)

(72) Inventors: Dominic Battre, Unterhaching (DE); Tyler Odean, San Francisco, CA (US); Erik Kay, Emerald Hills, CA (US)

(73) Assignee: GOOGLE LLC, Mountain View, CA (US)

( * ) Notice: Subject to any disclaimer, the term of this patent is extended or adjusted under 35 U.S.C. 154(b) by 960 days.

(21) Appl. No.: 14/820,927

(22) Filed: Aug. 7, 2015

Related U.S. Application Data

(60) Provisional application No. 62/036,321, filed on Aug. 12, 2014.

(51) Int. Cl.
| | | |
|---|---|---|
| *G06F 16/9536* | (2019.01) | |
| *G06Q 30/02* | (2012.01) | |
| *G06F 16/951* | (2019.01) | |
| *G06F 16/9535* | (2019.01) | |
| *G06F 16/16* | (2019.01) | |

(52) U.S. Cl.
CPC ....... *G06Q 30/0203* (2013.01); *G06F 16/951* (2019.01); *G06F 16/9535* (2019.01); *G06F 16/9536* (2019.01); *G06Q 30/0282* (2013.01); *G06F 16/168* (2019.01)

(58) Field of Classification Search
CPC ............ G06Q 30/0203; G06Q 30/0282; G06F 16/168; G06F 16/951; G06F 16/9535; G06F 16/9536

USPC .......................................... 705/7.32; 715/744
See application file for complete search history.

(56) References Cited

U.S. PATENT DOCUMENTS

| | | | | |
|---|---|---|---|---|
| 8,640,257 | B1 * | 1/2014 | Sherrets | G06F 21/6245 707/732 |
| 2004/0003392 | A1 * | 1/2004 | Trajkovic | H04N 7/163 725/10 |
| 2008/0168040 | A1 * | 7/2008 | Jones | G06Q 30/02 |
| 2008/0307316 | A1 * | 12/2008 | Askey | G06Q 30/02 715/747 |
| 2011/0254911 | A1 * | 10/2011 | Neuenschwander | G06Q 10/10 348/14.03 |

(Continued)

OTHER PUBLICATIONS

Savenkov, Denis et al. Search engine switching detection based on user personal preferences and behavior patterns. SIGIR 2013—Proceedings of the 36th International ACM SIGIR Conference.*

*Primary Examiner* — Timothy Padot
(74) *Attorney, Agent, or Firm* — Brake Hughes Bellermann LLP

(57) ABSTRACT

Techniques are provided for determining a user of a computing device who is likely to be unsatisfied with a value of a setting of a program running on the computing device. First information is collected about the value of the setting from a first population of users who invoke a routine to automatically reset the value of the setting to a default value. Second information is collected about the value of the setting from a second population of users who do not invoke the routine. Based on a comparison of the first information and the second information, a determination is made that a user in the second population is likely to be unsatisfied with the value of the setting.

20 Claims, 7 Drawing Sheets

(56) References Cited

U.S. PATENT DOCUMENTS

| | | | |
|---|---|---|---|
| 2011/0307354 A1* | 12/2011 | Erman | G06F 8/60 705/27.1 |
| 2011/0320575 A1* | 12/2011 | Pope | H04N 21/8543 709/220 |
| 2012/0166285 A1* | 6/2012 | Shapiro | G06Q 30/0251 705/14.58 |
| 2013/0232037 A1* | 9/2013 | Edwards | G07G 1/0036 705/27.1 |
| 2014/0324965 A1* | 10/2014 | Ralston | H04L 67/306 709/204 |

\* cited by examiner

USER RESET VOTING TO IDENTIFY UNWANTED SETTINGS VALUES IN CLIENT SOFTWARE

CROSS REFERENCE TO RELATED APPLICATION

This application is a nonprovisional of, and claims priority under 35 U.S.C. § 119 to, U.S. Provisional Patent Application Ser. No. 62/036,321, filed Aug. 12, 2014, entitled, "USER RESET VOTING TO IDENTIFY UNWANTED SETTINGS VALUES IN CLIENT SOFTWARE", the contents of which are incorporated herein by reference.

TECHNICAL FIELD

This description generally relates to computing devices. The description, in particular, relates to user reset voting to identify unwanted settings in client software.

BACKGROUND

A user may have one or more applications that they can run available to them on a computing device. Each application can have associated with it one or more settings. The application can access and use the associated settings when, for example, the user initiates the running of the application. These settings may be stored locally on the computing device in association with the application. When launched, the application can use the stored settings to determine one or more default states or conditions for the application. In some cases, the settings may be default settings for the application. In some cases, the settings may be settings defined by the user of the computing device, and stored locally on the computing device based on actions performed by the user prior to, or along with, the launching of the application.

At times, values of the settings may be changed, even though the user does not intend for the settings to be changed and even though the user does not prefer the new values of the settings. For example, a value of a setting may be changed automatically by software that the user installs on the client device. Re-setting the values of the settings to values preferred by the user may be complex for some users, and those users may continue to use the un-preferred values of the settings, despite a desire to use other settings values.

Thus, a need exists to remedy the deficiencies in the existing state of the art.

SUMMARY

In one general aspect, a method of determining a user of a computing device who is likely to be unsatisfied with a value of a setting of a program running on the computing device includes collecting first information about the value of the setting from a first population of users who invoke a routine to automatically reset the value of the setting to a default value and collecting second information about the value of the setting from a second population of users who do not invoke the routine, and determining, based on a comparison of the first information and the second information, that a user in the second population is likely to be unsatisfied with the value of the setting.

In yet another general aspect, a system for determining a user of the computing device who is likely to be unsatisfied with a value of the setting of a program running on the computing device, includes at least one processor; and memory storing instructions that, when executed by the at least one processor, cause the system to perform operations including: collecting first information about the value of the setting from a first population of users who invoke a routine to automatically reset the value of the setting to a default value; collecting second information about the value of the setting from a second population of users who do not invoke the routine; and determining, based on a comparison of the first information and the second information, that a user in the second population is likely to be unsatisfied with the value of the setting.

Implementations can include one or more of the following features, alone or in combination with other features. For example, the determination that the user is unsatisfied with the value of the setting can be based on a determination that the first information indicates that a first percentage of users in the first population are using the value of the setting when they invoke the routine and that a second percentage of users in the second population are using the value of the setting, where the first percentage is greater than the second percentage by a statistically significant amount. The program can be a browser program and the setting can include a setting of the browser program, a default search engine setting, a homepage setting, a new tab page setting, or a browser extension installed in the browser. The second population can include users who synchronize the value of the setting across different computing devices through a synchronization service provided by a server computer. The user can be prompted with an opportunity to change the value of the setting. Based at least in part on whether the user accepts the prompt to change the value of the setting, the determination that other users in the second population are likely to be unsatisfied with the value of the setting can be verified. First other users in the second population can be prompted with an opportunity to change the value of the setting, where the value of the setting of the prompted first other users is the same as the value of the setting for the user. Whether the first other users accept the prompt can be determined. Second other users in the second population can be prompted with an opportunity to change the value of the setting, where the value of the setting of the prompted second other users is the same as the value of the setting for the user. Whether the second users accept the prompt can be determined, and the determination that the user in the second population is likely to be unsatisfied with the value of the setting can be further based on a comparison of a proportion of users in the first population who accept the prompt with a proportion of users in the second population who accept the prompt.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
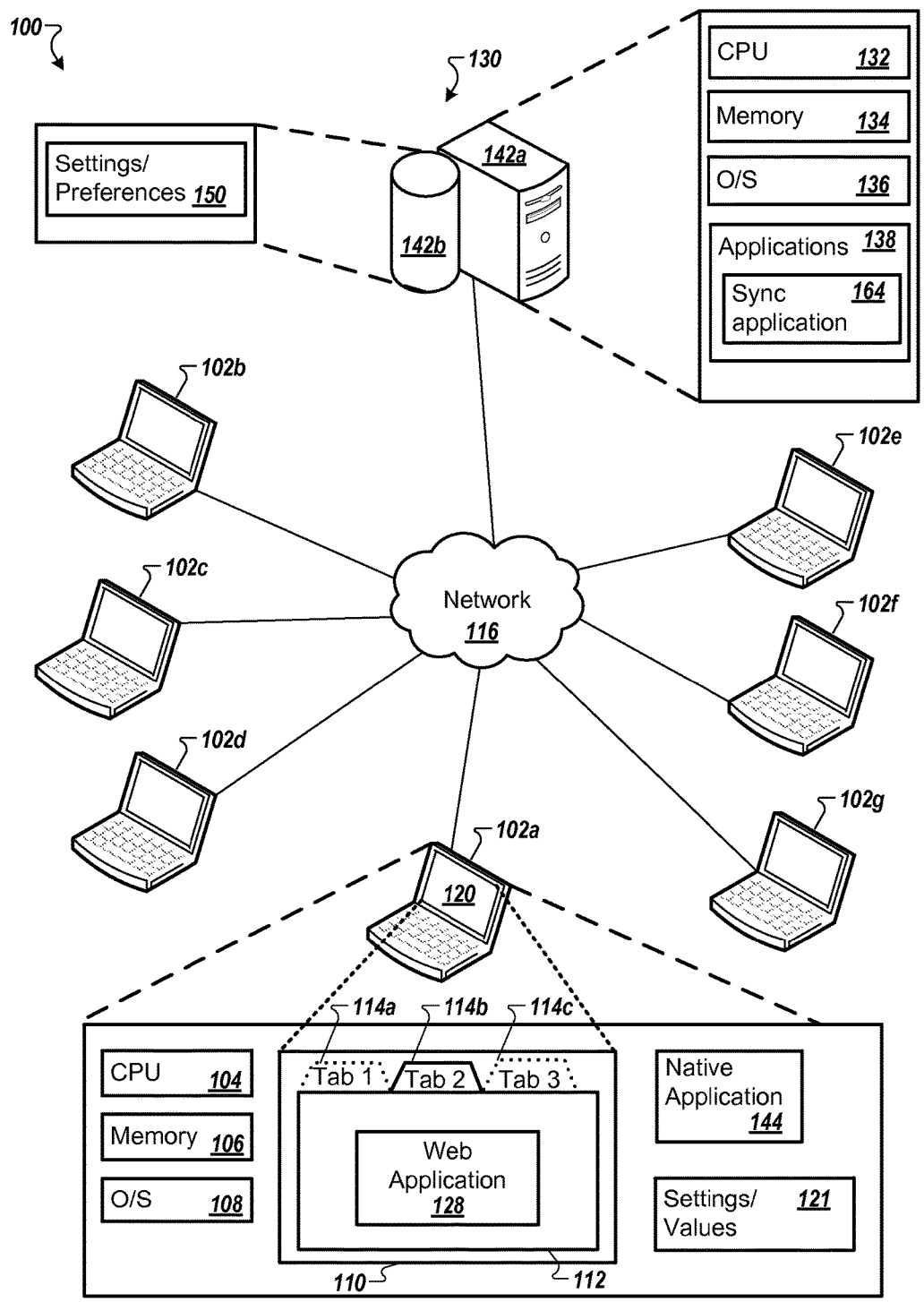
FIG. 1 is a diagram that illustrates an example system to authenticate a user, and sign and provide signed settings for the user.

Software (or applications) that can run (execute) on a computing device may have one or more settings (values) associated with them. Each application that can run on a computing device can have associated with it a unique group of settings that the application can access when it is launched by a user of the computing device, or when it is running on the computing device. For example, these settings may control the appearance and defaults settings for the application when launched. In another example, these settings may control the application's access to data and/or services outside of/remote to the computing device (e.g., located in the cloud, located in a remote storage device, etc.). For example, these settings may control the overall look and feel of the application when running on the computing device (e.g., the application's graphical user interface (GUI)). In another example, values of settings may determine certain functionality of an application running on the computing device. For example, settings may determine a default search engine used with a browser application, the content of a homepage that is loaded when a browser is launched, or the content that is loaded into a new tab of a browser when the new tab is opened in the browser. Settings for a browser application also may define the browser extensions that have been installed in the browser. For example, a browser extension can be defined by a unique browser extension ID. In some implementations, the user of the computing device may access the settings in order to specify/indicate or otherwise define values of the settings. In some cases, the settings may not be easily accessible to the user but instead may be stored/located in an area of the computing device whose access is restricted to just the application associated with the settings.

In some situations, however, another application (or script or piece of code) that is also present on the computing device may access the settings associated with the application. The access may occur based on the applications having similar permissions to access the settings, and to change the values of the settings, as indicated by the operating system. The access may occur without the permission of the user and, in some cases, without the user having any knowledge of the changes. As such, the operating system, which may oversee or otherwise control access to the settings for individual applications, may allow applications with similar operating system permissions to access each other's settings. In some cases, a second application accessing a first application's settings may do so maliciously, attacking the first application by changing (and, in some cases, removing) values of the settings associated with the first application. This can result in the computing device being compromised by the second application. For example, the second application may now gain access to private and/or personal information on the computing device. In another example, changing (or removing) the settings associated with the first application may render the first application unusable or simply unsatisfactory to the user of the computing device.

When the value of a setting is changed without the knowledge or consent of a user such that the user is unsatisfied with the value of the setting, a user who is relatively savvy may be able to figure out how to reset the value of the setting to a value that he or she deems satisfactory. However, less savvy users may not be able to figure out how to reset the value of the setting or may be reluctant to attempt to reset the value of the setting for fear of further degrading the performance of their computing device. To identify users who are likely to be unsatisfied with a value of a setting of their computing device, information can be collected from a first population of users who are deemed to be relatively savvy. For example, information about the value of a setting can be collected from the first population of savvy users when the savvy users invoke a routine to change the value of a setting (thus indicating that the previous value of the setting was unsatisfactory to the savvy user) and information about the value of the setting can be collected from a second population of users deemed to be unsavvy or from a general population of users. Information about the value of the setting from the two populations can be compared to determine values of the setting that are likely to be unsatisfactory to a user. For example, if a setting takes on one of four possible values with equal probability in a general population, but if the setting is highly likely to take on just a specific one of the four possible values at the time that a savvy user opts to change the setting, then it may be determined that the specific one of the values is likely to be unsatisfactory. In another example, if a setting has a probability, P, in the general population, but has a has a probability, P', for a population of savvy users who opt to change the setting, and if P' is statistically different from P, then it may be determined that the setting is likely to be unsatisfactory.

FIG. 1 is a diagram that illustrates an example system 100 to determine a user of the computing device who is likely to be unsatisfied with a value of the setting of a program running on the computing device. The example system 100 includes computing devices 102*a*, 102*b*, 102*c*, 102*d*, 102*e*, 102*f*, 102*g*. An example computing device 102*a* can include one or more processors (e.g., client central processing unit (CPU) 104) and one or more memory devices (e.g., client memory 106)). The computing device 102*a* can execute a client operating system (O/S) 108 and one or more client applications (e.g., a web browser application 110) that can display a user interface (UI) (e.g., web browser UI 112) on a display device 120 included in the computing device 102*a*. In addition or in the alternative, the computing device 102*a* can execute one or more web-based (web-hosted) applications 138 that can display a UI (e.g., web browser UI 112) on the display device 120 included in the computing device 102*a*. In addition, or in the alternative, the computing device 102*a* can execute one or more client applications (e.g., a web browser application 110) that can include that can execute code and render information to a user. The execution of code by the web browser 110 can cause the display of a UI within the client application (e.g., a UI within a web browser application 110) on the display device 120 included in the computing device 102*a*.

The system 100 includes a computer system 130 that can include one or more computing devices (e.g., server 142*a*) and one or more computer-readable storage devices (e.g., database 142*b*). The server 142*a* can include one or more processors (e.g., server CPU 132), and one or more memory devices (e.g., server memory 134). The computing device 102a can communicate with the computer system 130 (and the computer system 130 can communicate with the computing device 102a) using a network 116. The server 142a can execute a server O/S 136, and one or more server applications 138.

The database 142b can include (store, serve as a repository for) values of settings/values 150 for one or more users. As discussed in more detail herein, the values of the settings/values 150 can be provided by the client computing devices 102a, 102b, 102c, 102d, 102e, 102f, 102g in a manner such that they are not tethered to the identity of any individual user of the computing device 102a, 102b, 102c, 102d, 102e, 102f, 102g.

In some implementations, the web browser application 110 can include or be associated with one or more web applications (e.g., web application 128). The web application 128 can be executed/interpreted by the web browser application 110. The web application 128 executed by the web browser application 110 can include code written in a scripting language, such as, JavaScript, VBScript, ActionScript, or other scripting languages. In some implementations, the application 164 can be considered a web application 128.

In some implementations, the computing device 102a can be a laptop or a desktop computer, a smartphone, a personal digital assistant, a portable media player, a tablet computer, or other appropriate computing device that can communicate, using the network 116, with other computing devices or computer systems. In some implementations, the computing device 102a can perform client-side operations, as discussed in further detail herein. In some implementations, the computer system 130 can represent more than one computing device working together to perform server-side operations.

In some implementations, the network 116 can be a public communications network (e.g., the Internet, cellular data network, dialup modems over a telephone network) or a private communications network (e.g., private LAN, leased lines). In some implementations, the computing device 102a can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

A web application may be configured to perform a single task or multiple tasks for a user. In such an implementation, the web application may be configured to be executed or interpreted by the web browser. This is compared with the native applications (e.g., native application 144) that include machine executable code and are configured to be executed directly via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a native application 144. Examples of web applications include, but are not limited to, games, photo editors, and video players that can run inside the web browser application 110. The web application 128 can provide a dedicated UI for display on the display device 120. In some implementations, the application 164 can be a web application 128.

In various examples, a web browser may include or be configured to interact with one or more browser extensions. In this context, a "browser extension" may include one or more web pages packaged or grouped together as a definable whole, and configured to extend the functionality to the web browser. As described herein, "browser extensions" are small software programs that can modify and enhance the functionality of a web browser. They may be written using web technologies such as HTML, JavaScript, and CSS. Extensions may have little or no user interface. In some implementations, extensions may provide a small user interface icon or other user interface that may modify a browser's "chrome", which is defined herein to include an area outside of a webpage displayed in the browser (such as the borders of a web browser window, which include the window frames, menus, toolbars and scroll bars). Selecting the icon or the other user interface may activate the functionality of the extension within the browser. Some extensions may modify web pages, for example to block advertisements, or in some cases, malicious extensions may inject content, illegal activity, or advertisements to web pages against a user's intent. Some extensions may redirect a user to different, or additional, webpages than the webpage(s) specified by the user.

In some implementations, the computing devices 102a, 102b, 102c, 102d, 102e, 102f, 102g can run, or cause the operating system 108 to execute, the web browser application 110. The web browser application 110 can then provide, in the web browser UI 112, a plurality of panes or tabs 114a-c. The web browser UI 112 can be a visual area, usually rectangular, containing some kind of user interface. In a graphical user interface (GUI) used in the computing device 102a, the web browser UI 112 can be a two-dimensional object arranged on a plane of the GUI known as a desktop. The web browser UI 112 can include other graphical objects that may be called the "chrome" of the web browser, e.g., a menu-bar, toolbars, controls, icons. The web browser UI 112 can display the graphical objects on the display device 120. A user of the computing device 102a can interact with the graphical objects to provide input to, or otherwise control the operation of, the web browser application 110. Examples of the "chrome" of a web browser will be described herein with reference to FIGS. 2A-B, 3A-B, and 4.

The web browser UI 112 can include a working area in which a document, an image, folder contents, or other objects including information or data for the web application 128 can be displayed. An example of this is shown in FIGS. 2A-B, 3A-B, and 4. The working area can include one main object (e.g., a single web document interface) or multiple objects (e.g., more than one web document interface), where each object can be displayed in a separate window (or tab). Each tab can include a UI. In some applications, specifically web browser applications, multiple documents can be displayed in the individual tabs 114a-c. The tabs 114a-c are typically displayed one at a time, and are selectable using a tab-bar, which often resides above the contents of an individual window.

As described in more detail herein (e.g., in the context of FIG. 4), values of settings can be set locally by a user of the computing device 102, can be set by a manager of a number of computing devices (e.g., a corporate information technology manager of a number of different computing devices), can be set by a manufacturer or provider of a computing device before the device is acquired by a user. For example, values of settings for a default search engine used with a web browser, for a URL for content to display in a new tab page that is opened in a web browser, and for a URL for content display in a homepage when a web browser is opened can be set by a user of the computing device, or by an information technology manager of the computing device, or by a manufacturer or provider of the computing device. The values of settings can be stored in a local memory location 121 associated with the computing device 102.

Figure 2B:
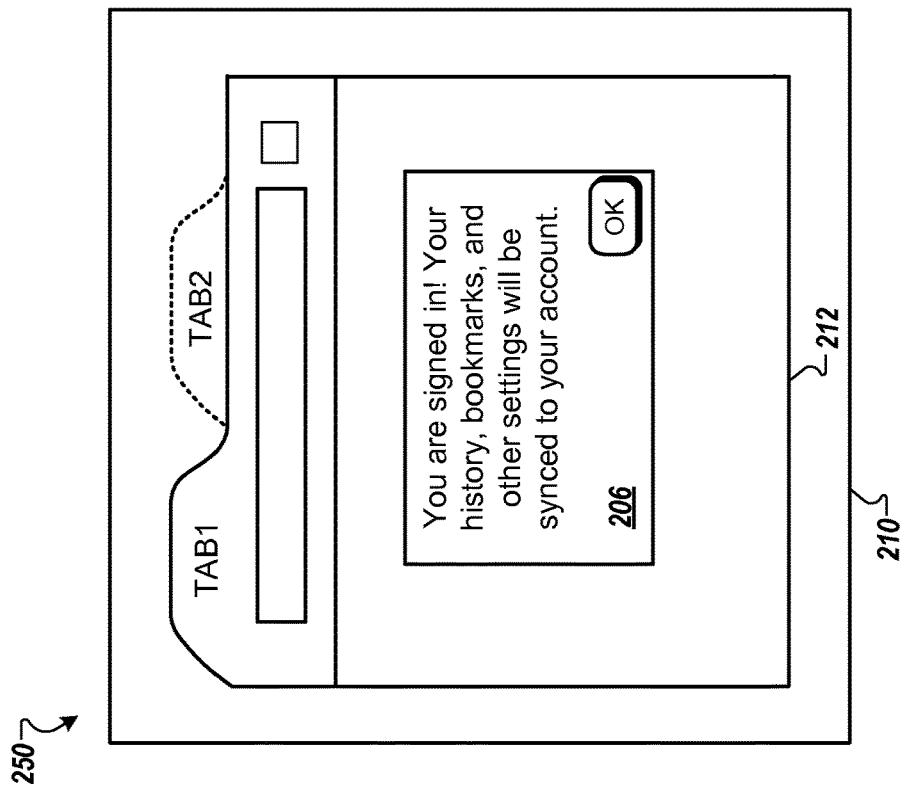
FIGS. 2A and 2B are diagrams that illustrate example user interfaces for signing into a web browser application.
Figure 2A:
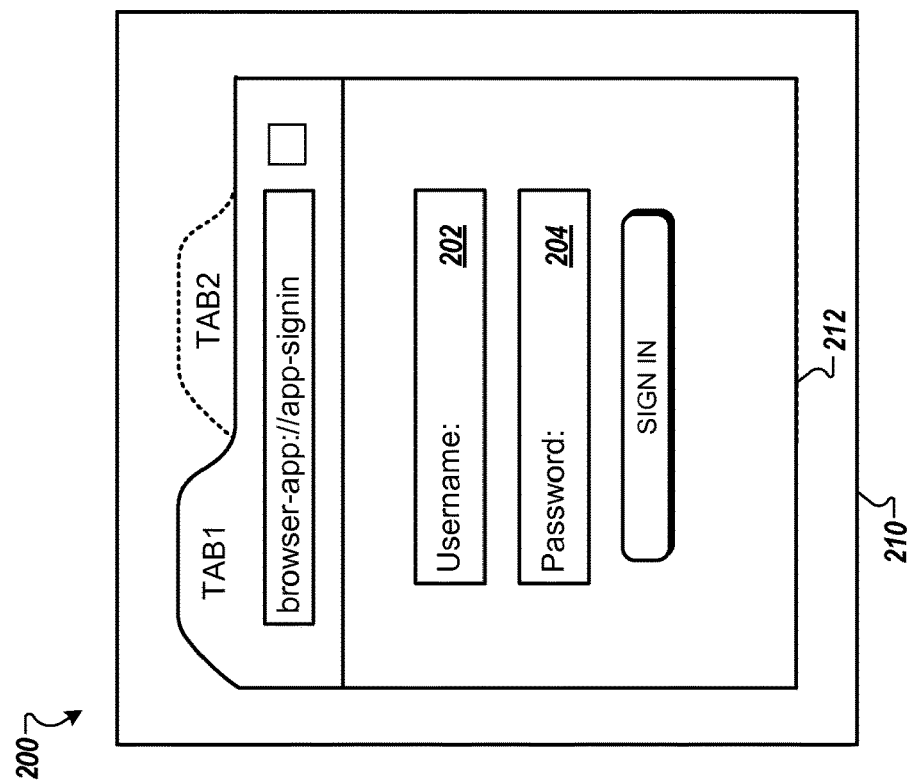

FIGS. 2A-B are diagrams that illustrate example user interfaces (user interface 200 and user interface 250, respectively) for signing into a web browser application that is executed on the computing device 102.

In FIG. 2A, the user interface 200 presents a sign-in page (a sign-in web page) where a user can enter credentials in provided fields (e.g., a username field 202 and a password field 204), where the credentials are associated with the user for authentication of the user for further use of various functions of the application. In the example of FIG. 2A (and referring to FIG. 1), the user interface 200 is presented in the UI (e.g., web browser UI 212) of a web browser application (e.g., web browser application 210) running on a computing device (e.g., computing device 102a). For example, the web browser application 210 can receive the user credentials (e.g., a username entered in the field 202 and a password entered in the password field 204). The web browser application 210 can authenticate the user, based on the user credentials, for use with an application (e.g., the sync application 164) that can execute on a server (e.g., server 142a) remote from the computing device. In some implementations, the web browser application 210 may be running locally on the computing device and the application 164 can run remotely on the server.

As an example, referring to FIG. 1, the server 142a can authenticate the user and the credentials (e.g., the username entered in the username field 202 and the password entered in the password field 204) stored for/associated with the user in the user data 162 included in the database 142b.

In FIG. 2B, the user interface 250 presents a confirmation page 206 informing the user that they have been authenticated for use of other functions of the web browser application 210. In the example of FIG. 2A (and referring to FIG. 1), the user interface 250 is presented in the UI (e.g., web browser UI 212) of the web browser application (e.g., web browser application 210) running on the computing device (e.g., computing device 102a). For example, referring to FIG. 1, the server 142 has authenticated the user. As a result of the user authentication, the web browser application (e.g., web browser application 210) can launch an application (e.g., application 164) associated with the web browser application 210. The application 164 may be launched on an opt-in basis, which requires that the user specifically grant permission for the application to be launched as a result of the user authentication. In one implementation the application 164 can synchronize settings/values for the user with user data for the user that is associated with an account for the user. The synchronized settings/values can be stored in a settings/values file for the user that is included in the stored the settings/values files 150 in the database 142b. The data for the user can be included/stored in association with the user (in an account for the user) included in the user data in the database 142b. The synchronization can allow the users settings/values to be automatically downloaded and used on any computing device 102 that the user uses to authenticate himself or herself to the web browser application 210. For example, the settings/values can include the user's bookmarks, open tabs ages, search history, installed browser extensions, and browser settings (e.g., default search engine, URL to launch in a new browser tab, and URL to launch in a homepage when the browser is first opened).

Figure 3B:
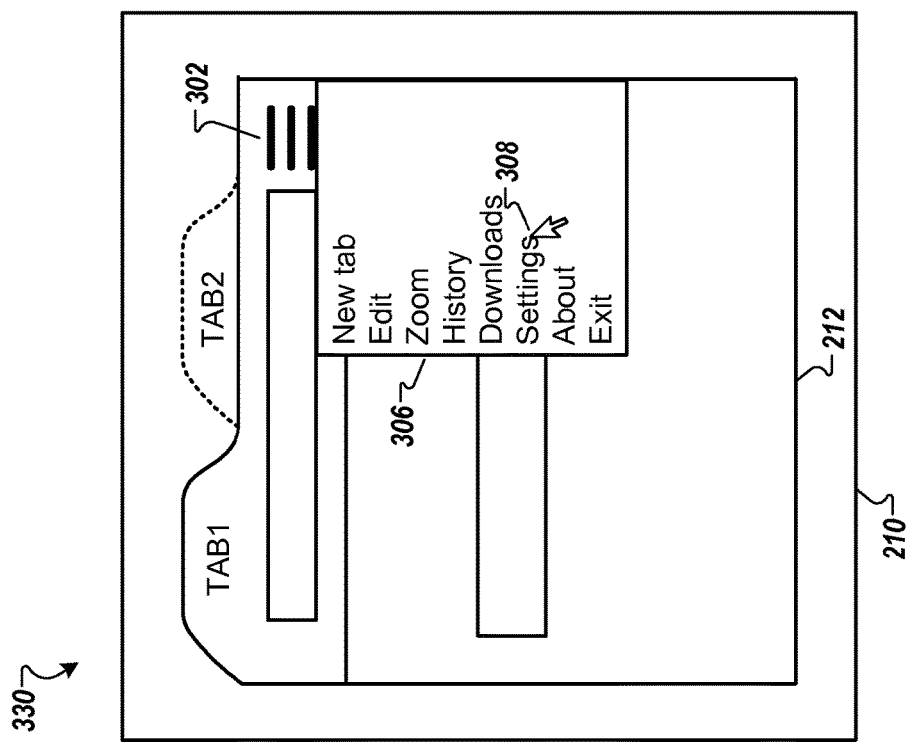
FIGS. 3A and 3B are diagrams that illustrate example user interfaces for gaining access to settings and values for a user.
Figure 3A:
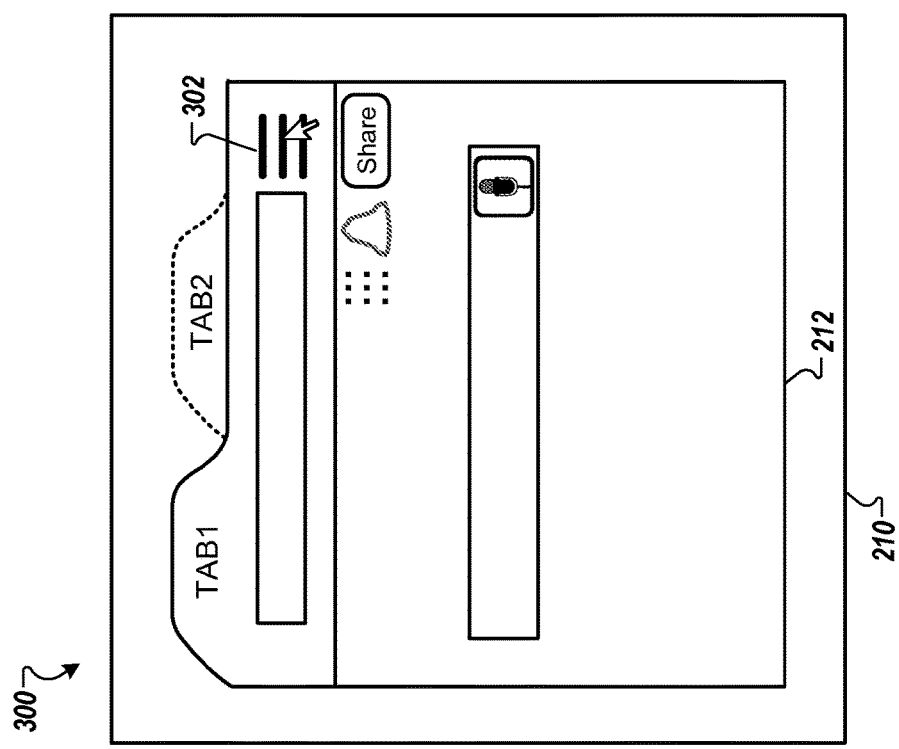

FIGS. 3A-B are diagrams that illustrate example user interfaces 300, 330, 360, respectively, for gaining access to a user's settings/values for an application.

FIG. 3A is a diagram that illustrates an example user interface 300 for a web browser application. In the example of FIG. 3A (and referring to FIGS. 1 and 2A-B), the user interface 300 is presented in the UI (e.g., web browser UI 212) of the web browser application (e.g., web browser application 210) running on the computing device (e.g., computing device 102a). The web browser application 210 can receive a selection of a customization icon 302. In response, the web browser application 210 can provide a drop down customization menu 306 as shown in the user interface 330 in FIG. 3B. The web browser application 210 can receive the selection of a settings choice 308. In response, the web browser application 210 can display a settings menu 402 (a settings page 402), as shown in a user interface 400 in FIG. 4.

Figure 4:
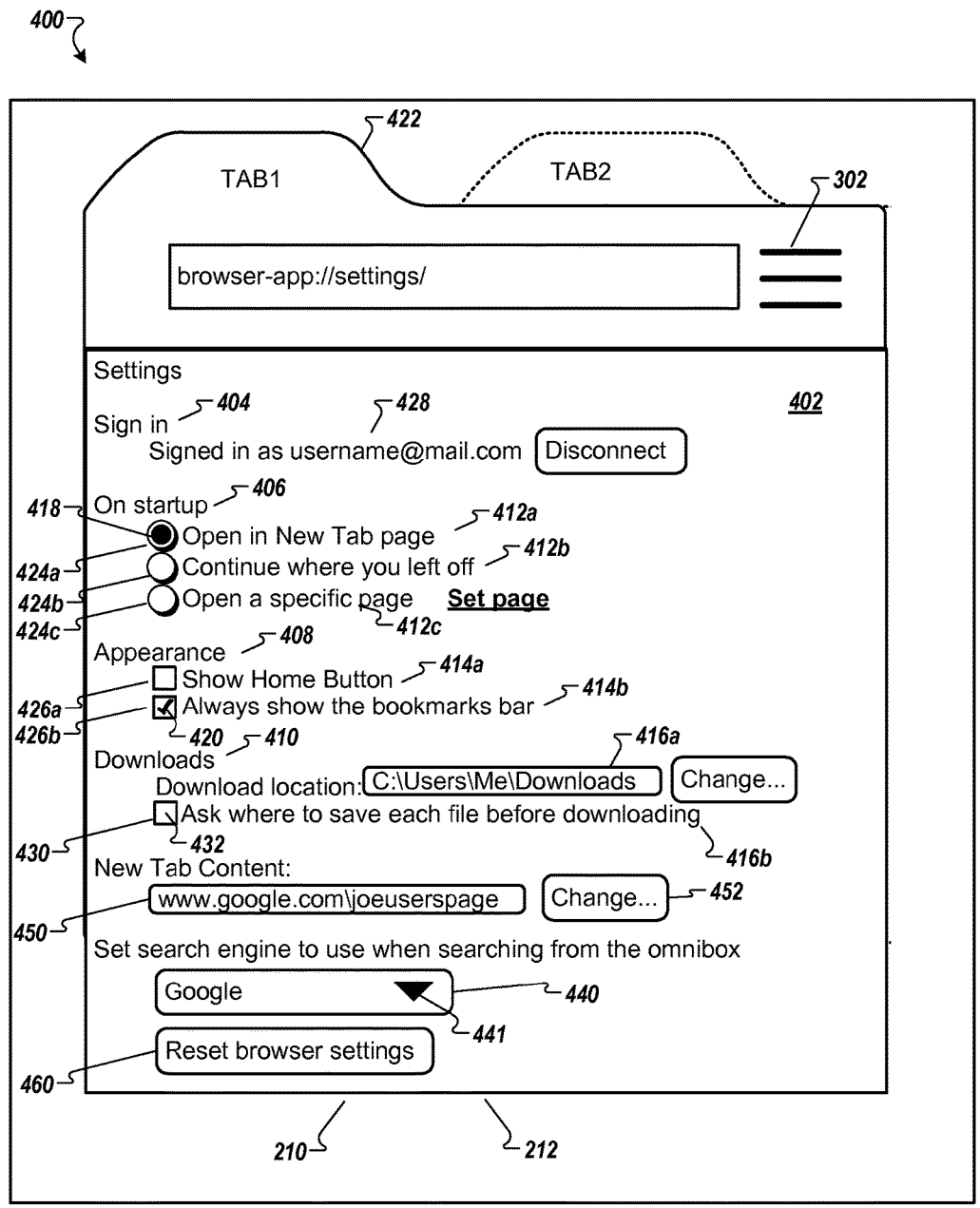
FIG. 4 is a diagram that illustrates an example user interface for accessing/viewing/modifying settings/values for an authenticated user.

FIG. 4 is a diagram that illustrates an example user interface 400 for accessing (viewing/modifying) settings/values for an authenticated user. As described with reference to FIGS. 1, 2A-B, and 3A-B, the web browser application 210 can display the settings menu 402, as shown in the user interface 400, on the display device 120 of the computing device 102a. In some implementations, the web browser application 210 can display the settings menu 402 responsive to the selection of the settings choice 308 and for an authenticated user. As shown in FIG. 4, a sign-in setting 404 includes an identifier 428 indicative of the signed-in authenticated user.

For example, referring to FIG. 4, the settings menu 402 can display settings 406, 408, and 410. The settings menu 402 can display values 412a-c for on startup setting 406, values 414a-b for an appearance setting 408, and values 416a-b for a downloads setting 410.

Selection of a user-interface element 440 may open a drop down menu with which the user may set a value for a default search engine to use in connection with the browser application 210. An icon 441 can indicate that the user-interface element 440 includes a drop down menu that lists a plurality of selectable values that may be selected for the search engine setting. Also within the user interface 400, the user may set a value for a URL of a webpage to open when the browser application is launched (e.g., with the "open a specific tab page" setting 424c). In addition, by selecting a user interface element 452, the user may set a value in user interface element 450 for a URL of a webpage to open when a new tab in the browser is open.

The application can display, on the settings menu 402, an indication of the current value for the setting. For example, the application can display indicator 418 in the settings menu 402 indicating that the current user value for the on startup setting 406 is "open in new tab page". Similarly, the application can display indicator 420 in the settings menu 402 indicating that the current user value 412b for the appearance setting is "always show the bookmarks bar."

In some implementations, the application can receive selections of radio buttons (e.g., radio buttons 424a-c) and check boxes (e.g., check boxes 426a-b). The selection of a radio button and/or a check box can indicate a selection of a value for a setting. In some cases, the application can receive input in an input field (e.g., download location field 416a) indicative of a value (e.g., a location) for a setting (e.g., downloads setting 410).

The settings/values can be stored in a settings/values file 121 included in the computing device (e.g., the computing device 102a as shown in FIG. 1). For example, referring to FIG. 1, the settings/values file can be stored in the memory 106.

Figure 5:
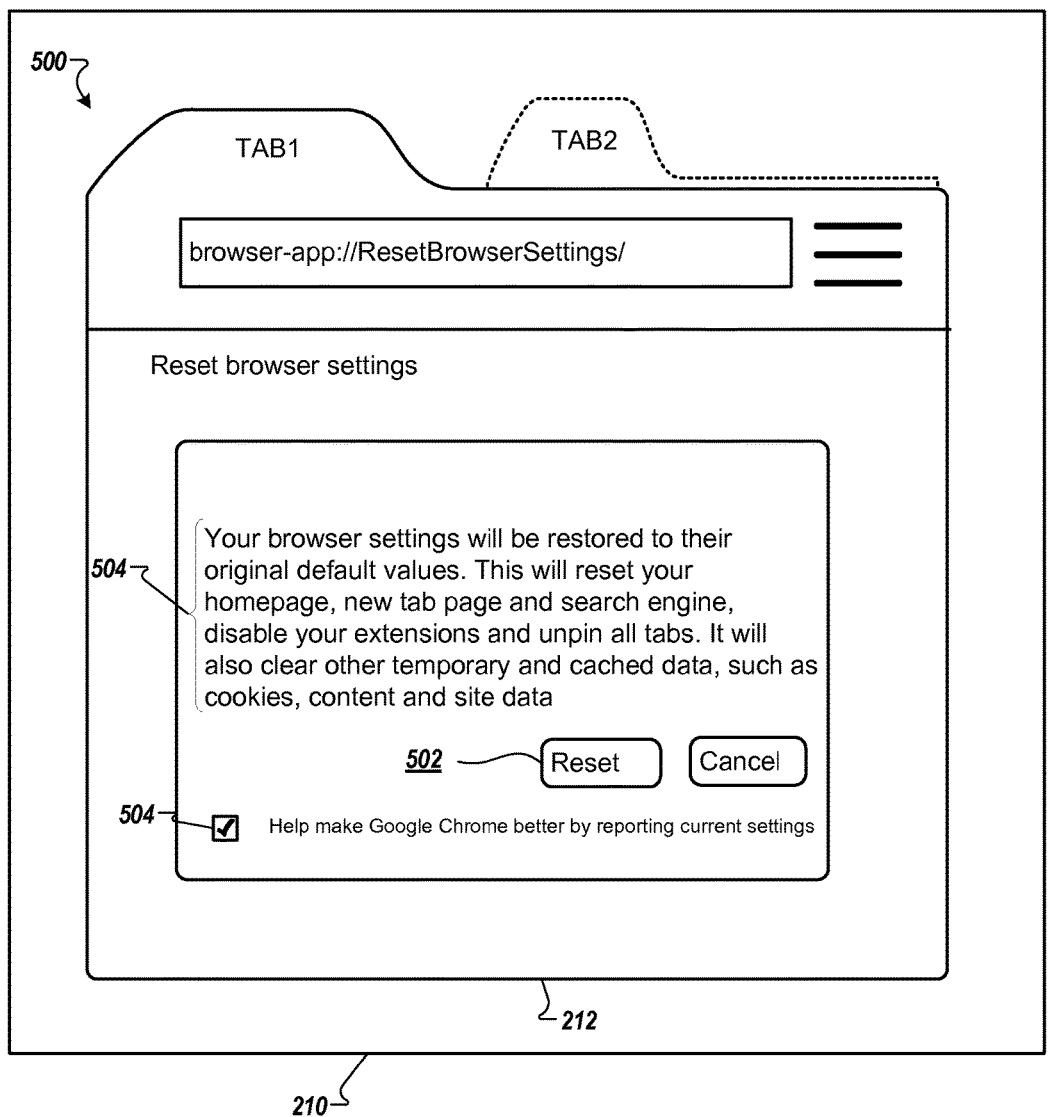
FIG. 5 is a diagram that illustrates an example user interface for accessing/viewing/modifying settings/values for an unauthenticated user.

Still referring to FIG. 4, selection of a "Reset browser settings" user-interface element 460 may launch a user interface as shown in FIG. 5, which is a diagram that illustrates an example user interface 500 for resetting settings/values for a user's application. As shown in FIG. 5, the user interface element 500 can include a selectable reset button 502, the selection of which causes the application to automatically restore the values of one or more settings of the application to default values. The user interface 500 can include a text description 504 explaining the action(s) performed as a result of selecting the button 502. For example, the text description can explain that by selecting the button 502 the values of the home page setting, the new tab page setting and the search engine setting will be reset to original default values. The original default values can be values that existed when the computing device was sold, or when an operating system or the application was installed on the computing device. In addition, selecting the button 502 can cause the web browser application to automatically disable browser extensions that have been installed on the browser and to unpin all tabs with the browser. In addition, selection of the button can cause the web browser to delete temporary and cached data associated with the browser, such as cookies content, and site data. The user interface 500 can include a selectable button 504 to cancel the resetting of settings associated with the browser.

The user interface 500 can include a selectable user-interface element 506 that a user may select to provide feedback to a developer of the application (e.g. the web browser application), so that the developer may improve the performance of the application based on the feedback. For example, by selecting the user interface element 506 and then selecting the reset button 502, the user can provide information to the developer about the values of settings that existed immediately before the settings were reset to their original default values. As described in more detail herein, the developer can use this information to determine that one or more values the settings that existed immediately before the settings were reset may be undesirable or unsatisfactory values of settings perspective of a user.

Referring again to FIG. 1, the system 100 can determine a user of a computing device (e.g., computing device 102a) who is likely to be unsatisfied with the value of a setting of a program running on the computing device, without the user expressly indicating that he or she is unsatisfied with the setting. Information about settings of applications executing on computing devices can be collected from two populations of users: a first population of users who are known to be unsatisfied with one or more settings of an application executing on their computing device; and a second "base" population of users who are not known to be unsatisfied with the one or more settings of the application.

Information can be collected from the first population of users who invoke a routine to automatically reset the value of the setting to a default value. Users who invoke the routine to automatically reset the value to a default value can be defined as users who are unsatisfied with the value of the setting. For example, users of a first plurality of computing devices 102b, 102c, and 102d can select the "Reset browser settings" user-interface element 460 within an application and then may select the reset button 502 to cause the application to automatically restore the values of one or more settings of the application to default values. These users may also select the user interface element 504, such that when the values of the one or more settings are reset to default values the values of the settings before the reset operation is performed are transmitted to server computing device 130.

Information transmitted from the computing devices 102 to the server computing device 130 may be transmitted in a privacy preserving manner, such that no information that could be used to reveal the identity of a user of a client computing device 102 is transmitted to the server computing device 130. The server computing device 130 may store the transmitted information about the settings/values 150 in the database 142b.

Information about the values of settings of the application also can be collected from the second population of users (e.g., users of devices 102a, 102e, 102f, 102g) who do not select the user interface element 460 within the application. For example, information can be collected about the values of settings of users who sync the values of their settings across different computing devices through a server computing device 130, or from users who opt in to submitting information about how they use the application to a service running on a server computing device 130, or from users who opt in to responding to polls or requests for information about the values of settings that they use for the application. This information also can be provided in a privacy preserving manner, such that the collected information cannot be used to identify a particular user of the computing device. The server computing device 130 also may store the transmitted information about the settings/values 150 in the database 142b.

The information collected from the first and second populations of users can be compared to determine values of settings that appear significantly disproportionately in the two different populations. Such values may be determined to be values with which a user is likely to be unsatisfied. For example, if the probability of finding a particular value in the second population is A and the probability of finding the particular value in the first population is A+B, then the value may be determined to be of value with which a user is likely to be unsatisfied if A+B is more than one standard deviation, or, in some implementations, two standard deviations, or, in some implementations, three standard deviations greater than A. If the particular value is found with approximately the same probability in both the first and second populations, then it may be determined that the particular value has no correlation with a user being unsatisfied with the value. In some implementations, a machine learning approach may be used to determine setting values with which a user may be unsatisfied. For example, machine learning algorithms may determine setting values for a program that are associated with a user choosing to automatically reset setting values of the program. Machine learning algorithms also can be associated with combinations of settings that are associated with a user choosing to automatically reset values of the program. For example, a machine learning algorithm may determine that if a search engine setting for a browser program is set to "foo.com" in combination with the new tab page setting of the browser being set to "bar.com" that the user is likely to reset the settings of the browser.

In some implementations, information can be collected from users who do not invoke the routine to automatically reset the value of the setting to a default value but who nevertheless are defined as users who are unsatisfied with the value of the setting. For example, users who synchronize their settings between different computing devices or who opt to provide information about how they use the application to an online service, may manually change the value of the setting from a particular value to a default value, and the change from the particular value to the default value may be used to define the particular value as a value with which a user is likely to be unsatisfied.

Once a particular value for a setting of an application has been determined to be one with which a user is likely to be unsatisfied, one or more actions to help users have computing devices that execute the application with the particular value for the setting. For example, in some implementations, such users can be prompted to reset the particular value of the setting to a default value for the setting by selecting the user interface element 460 to invoke the routine to automatically reset the value of the setting to the default value. In some implementations, such users can be queried about whether they would like to reset the particular value of the setting to a different value. A percentage of positive responses from the user to the prompt or query that is greater than a threshold percentage can indicate that the determination that the particular value is one with which a user is likely to be unsatisfied is correct. A percentage of positive responses from the user to the prompt or query that is lower than the threshold percentage can indicate that the determination that the particular value is one with which a user is likely to be unsatisfied is incorrect.

In some implementations, the determination that a particular value is likely to be unsatisfactory for a user can be confirmed by additional statistical information. For example, first other users in the second population (i.e., users who do not invoke the routine to automatically reset the value of the setting to a default value) who use a particular value for the setting can be prompted to change the value of setting, and a determination can be made whether these users accept the prompt. In addition, second other users in the second population who use one or more values for the setting that are different from the particular value can be prompted to change the value of the setting, and a determination can be made whether the second other users accept the prompt. If the proportion of the first other users who accept the prompt exceeds the proportion of second other users who accept the prompt by a threshold amount by a statistically significant amount, then the determination that the particular value is likely to be unsatisfactory for user can be confirmed.

Once a determination has been made to a particular value is one with which users are likely to be unsatisfied, and, in some implementations, the determination has been confirmed by a relatively high percentage of users with the particular value who accept to change the particular value, other users who have the particular value as a setting for the application can be aided to reset the value of the setting. For example, in some implementations, users who have the particular value as a value for a setting of the application can be prompted to reset the value of the setting to a different value. In some implementations, the particular value can be blacklisted as a value that users are warned against using when executable code attempts to reset the setting to use the particular value or can be blacklisted as values that are forbidden from using as a value for a setting on a particular device.

Figure 6:
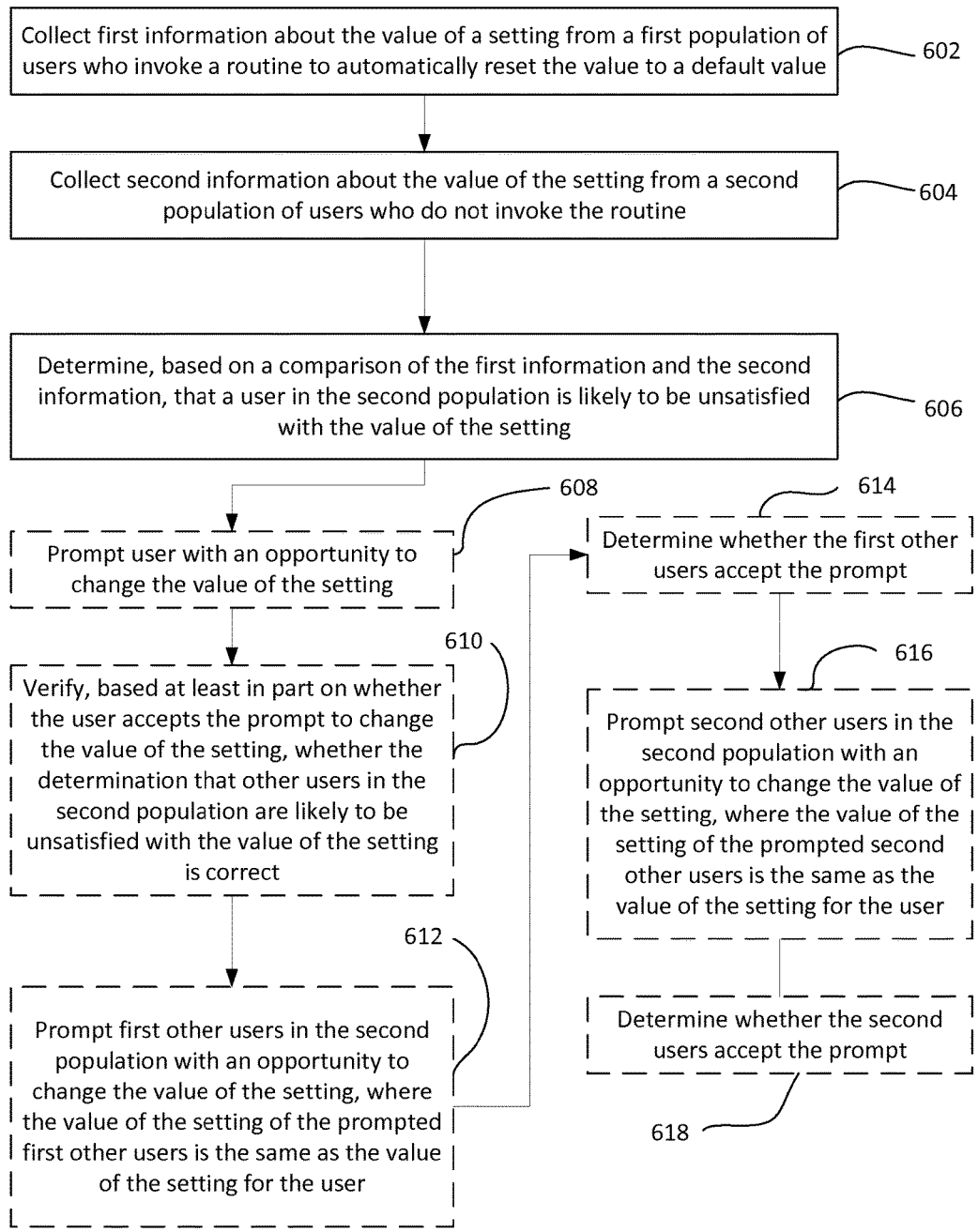
FIG. 6 is a flow chart of a process for determining a user of a computing device who is likely to be unsatisfied with a value of a setting of a program running on the computing device.

FIG. 6 is a flow chart of a process 600 for determining a user of a computing device who is likely to be unsatisfied with a value of a setting of a program running on the computing device. The process includes collecting first information about the value of the setting from a first population of users who invoke a routine to automatically reset the value of the setting to a default value (602). In some implementations, the program can be a browser program and the setting can include a setting of the browser program (e.g., a default search engine setting, a homepage setting. a new tab page setting, and/or a browser extension installed in the browser).

Second information about the value of the setting is collected from a second population of users who do not invoke the routine (604). In some implementations, the second population can include users who synchronize the value of the setting across different computing devices through a synchronization service provided by a server computer.

Based on a comparison of the first information and the second information, a determination is made that a user in the second population is likely to be unsatisfied with the value of the setting (606). The determination can be based on a determination that the first information indicates that a first percentage of users in the first population are using the value of the setting when they invoke the routine and that a second percentage of users in the second population are using the value of the setting, wherein the first percentage is greater than the second percentage by a statistically significant amount.

In addition, the user may be prompted with an opportunity to change the value of the setting (608). Also in addition, based at least in part on whether the user accepts the prompt to change the value of the setting, the determination that other users in the second population are likely to be unsatisfied with the value of the setting may be verified (610).

Also in addition, first other users in the second population may be prompted with an opportunity to change the value of the setting, where the value of the setting of the prompted first other users is the same as the value of the setting for the user (612). Whether the first other users accept the prompt may be determined (614). Second other users in the second population can be prompted with an opportunity to change the value of the setting, where the value of the setting of the prompted second other users is the same as the value of the setting for the user (616), and whether the second users accept the prompt can be determined (618). The determination that the user in the second population is likely to be unsatisfied with the value of the setting can be further based on a comparison of a proportion of users in the first population who accept the prompt with a proportion of users in the second population who accept the prompt.

Figure 7:
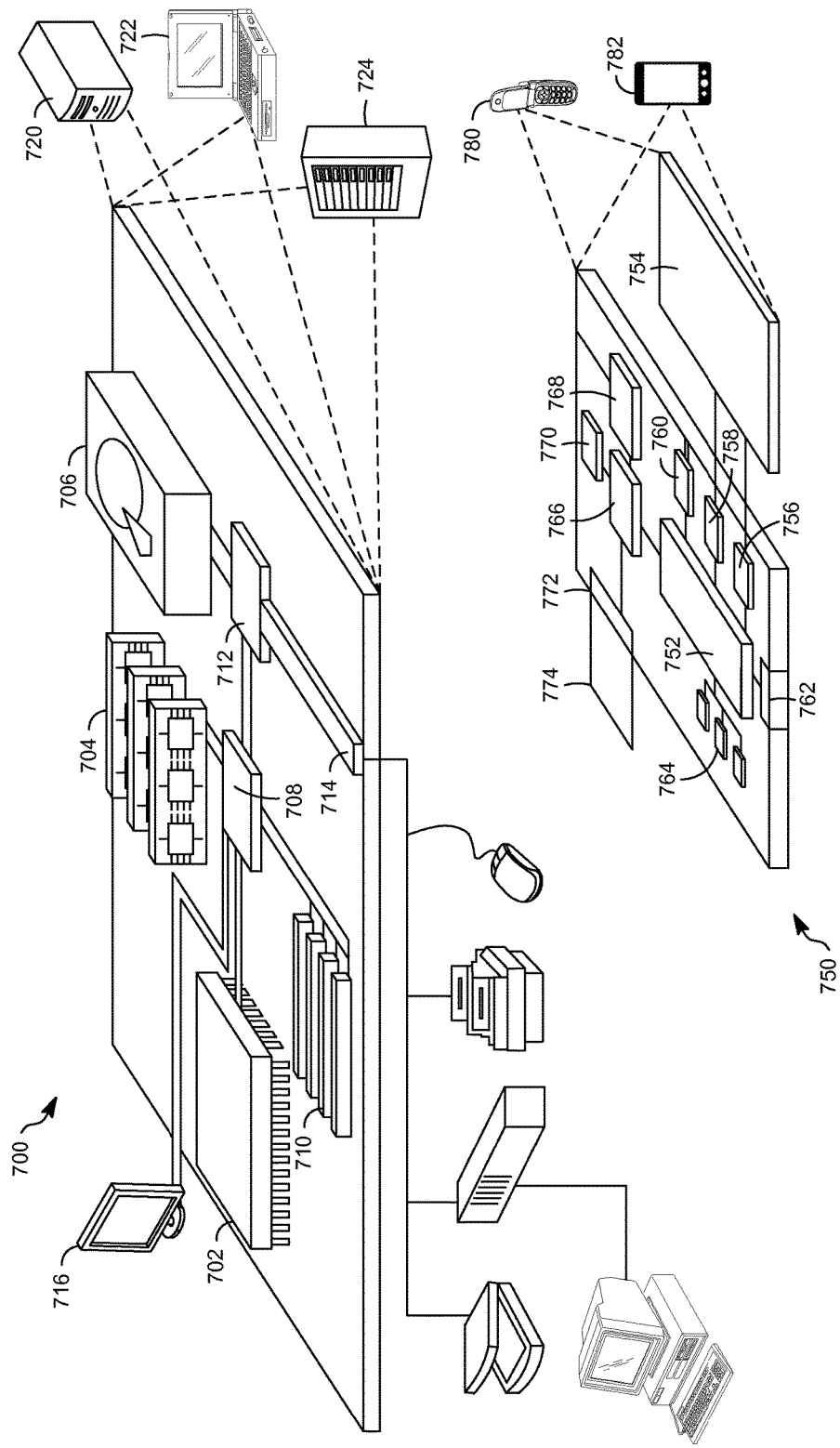
FIG. 7 shows an example of a computer device and a mobile computer device that can be used to implement the techniques described herein.

FIG. 7 shows an example of a computer device and a mobile computer device that can be used to implement the techniques described here. FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The computing system can include clients and servers. A client and server are generally remote from each other and typically interact through a communication network. The relationship of client and server arises by virtue of computer programs running on the respective computers and having a client-server relationship to each other.

In situations in which the systems and methods discussed herein collect personal information about users, or may make use of personal information, the users may be provided with an opportunity to control whether programs or features collect user information (e.g., information about a user's social network, social actions or activities, profession, a user's values, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of determining a user of a computing device who is likely to be unsatisfied with a value of a setting of a program running on the computing device, the method comprising:
    defining, by a server computing device, a first population of users who have invoked a routine to automatically reset a value of a setting to a default value based on receiving, from user computing devices, values of the settings when the users invoke the routine;
    collecting first information about the setting from the first population of users, the first information including a percentage of users of the first population with the setting having a specific value when users of the first population invoke the routine;
    collecting second information about the setting from a second population of users who do not invoke the routine, the second information including a percentage of users in the second population with the setting having the specific value;

identifying a user in the second population who has the setting set to the specific value;

determining, based on a comparison of the first information and the second information, that the user is likely to be unsatisfied with the value of the setting; and causing a user computing device to prompt the user to change the value of the setting based on the determining that the user is likely to be unsatisfied with the value of the setting.

2. The method of claim 1, wherein the determining is based on a determination that the first information indicates that a first percentage of users in the first population are using the value of the setting when they invoke the routine and that a second percentage of users in the second population are using the value of the setting, wherein the first percentage is greater than the second percentage by a statistically significant amount.

3. The method of claim 1, wherein the program is a browser program and wherein the setting includes a setting of the browser program.

4. The method of claim 3, wherein the setting includes a default search engine setting.

5. The method of claim 3, wherein the setting includes a homepage setting.

6. The method of claim 3, wherein the setting includes a new tab page setting.

7. The method of claim 3, wherein the setting includes a browser extension installed in the browser.

8. The method of claim 1, wherein the second population includes users who synchronize the value of the setting across different computing devices through a synchronization service provided by a server computer.

9. The method of claim 1, further comprising:
verifying, based at least in part on whether the user accepts the prompt to change the value of the setting, whether the determination that other users in the second population are likely to be unsatisfied with the value of the setting is correct.

10. The method of claim 1, further comprising:
prompting first other users in the second population to change the value of the setting, wherein the value of the setting of the prompted first other users is the same as the value of the setting for the user;
determining whether the first other users accept the prompt;
prompting second other users in the second population to change the value of the setting, wherein the value of the setting of the prompted second other users is the same as the value of the setting for the user; and
determining whether the second other users accept the prompt,
wherein determining that the user in the second population is likely to be unsatisfied with the value of the setting is further based on a comparison of a proportion of users in the first population who accept the prompt with a proportion of users in the second population who accept the prompt.

11. A system for determining a user of a computing device who is likely to be unsatisfied with a value of a setting of a program running on the computing device, the system comprising:
at least one processor; and
memory storing instructions that, when executed by the at least one processor, cause the system to perform operations including:
defining, by a server computing device, a first population of users who have invoked a routine to automatically reset a value of a setting to a default value based on receiving, from user computing devices, values of the settings when the users invoke the routine;
collecting first information about the setting from the first population of users, the first information including a percentage of users in the first population with the setting having a specific value when users of the first population invoke the routine;
collecting second information about the setting from a second population of users who do not invoke the routine, the second information including a percentage of users in the second population with the setting having the specific value;
identifying a user in the second population who has the setting set to the specific value;
determining, based on a comparison of the first information and the second information, that the user is likely to be unsatisfied with the value of the setting; and
causing a user computing device to prompt the user to change the value of the setting based on the determining that the user is likely to be unsatisfied with the value of the setting.

12. The system of claim 11, wherein the determining is based on a determination that the first information indicates that a first percentage of users in the first population are using the value of the setting when they invoke the routine and that a second percentage of users in the second population are using the value of the setting, wherein the first percentage is greater than the second percentage by a statistically significant amount.

13. The system of claim 11, wherein the program includes a browser program and wherein the setting includes a setting of the browser program.

14. The system of claim 13, wherein the setting includes a default search engine setting.

15. The system of claim 13, wherein the setting includes a homepage setting.

16. The system of claim 13, wherein the setting includes a new tab page setting.

17. The system of claim 13, wherein the setting includes a browser extension installed in the browser.

18. The system of claim 11, wherein the second population includes users who synchronize the value of the setting across different computing devices through a synchronization service provided by a server computer.

19. The system of claim 11, the memory further storing instructions that, when executed by the at least one processor, cause the system to perform operations including:
verifying, based at least in part on whether the user accepts the prompt to change the value of the setting, whether the determination that other users in the second population are likely to be unsatisfied with the value of the setting is correct.

20. The system of claim 11, the memory further storing instructions that, when executed by the at least one processor, cause the system to perform operations including:
prompting first other users in the second population to change the value of the setting, wherein the value of the setting of the prompted first other users is the same as the value of the setting for the user;

determining whether the first other users accept the prompt;

prompting second other users in the second population to change the value of the setting, wherein the value of the setting of the prompted second other users is the same as the value of the setting for the user; and determining whether the second other users accept the prompt, wherein determining that the user in the second population is likely to be unsatisfied with the value of the setting is further based on a comparison of a proportion of users in the first population who accept the prompt with a proportion of users in the second population who accept the prompt.

* * * * *